March 14, 1944.   W. W. CUMMINGS, JR   2,343,959
AIR CONDITIONING UNIT
Filed June 15, 1942   2 Sheets-Sheet 1

INVENTOR:
William W. Cummings, Jr.
by Dike, Calver & Porter
Attys.

March 14, 1944.   W. W. CUMMINGS, JR   2,343,959
AIR CONDITIONING UNIT
Filed June 15, 1942   2 Sheets-Sheet 2
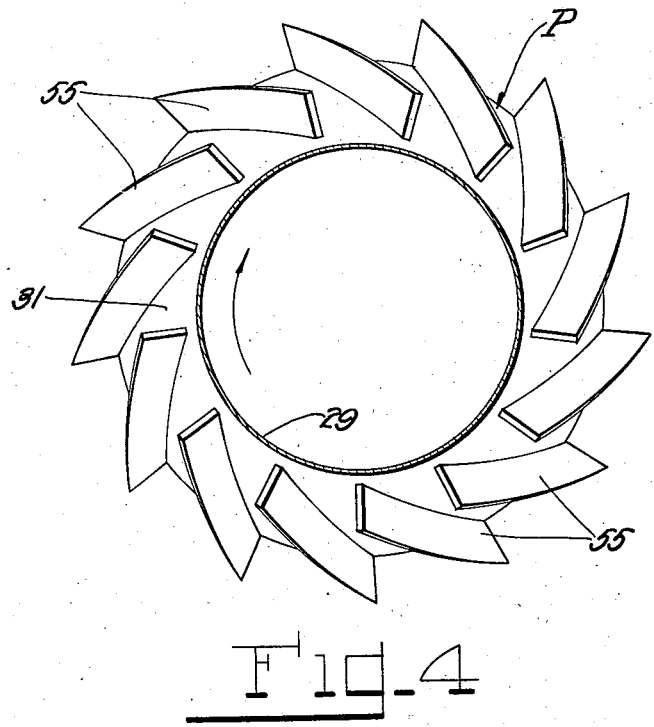
Fig_4
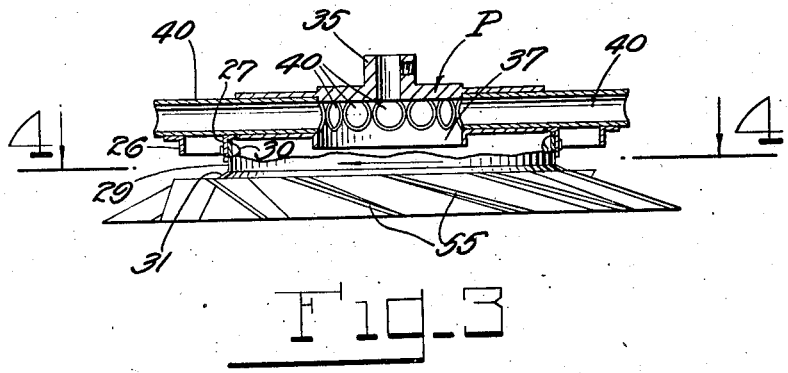
Fig_3
INVENTOR:
William W. Cummings, Jr.
by Dike, Calver & Porter
Attys.

Patented Mar. 14, 1944

2,343,959

UNITED STATES PATENT OFFICE 2,343,959

AIR CONDITIONING UNIT

William Warren Cummings, Jr., Cambridge, Mass.

Application June 15, 1942, Serial No. 447,117

5 Claims. (Cl. 261—30)

The present invention relates to apparatus for conditioning air in which the air to be conditioned is compressed, and as it is compressed, heat is extracted therefrom.

An apparatus of this type for conditioning air is described in my Patent No. 2,239,594, dated April 22, 1941. In that apparatus, inlet and outlet ducts connect a compressor with the room to be air conditioned and the flow of air therethrough is induced by a blower connected to the outlet duct. As the air is compressed heat is extracted from the air by cooling coils so that its temperature is reduced and excess moisture is precipitated.

In accordance with the present invention, the air to be conditioned is caused to impact, while moving at high velocity, with a stream of liquid, such as a water spray, moving in the opposite direction at high velocity. The force of the impact compresses the air and at the same time heat is extracted by contact with the liquid. As a result, the air is cooled and excess moisture is precipitated therefrom.

In its more specific aspect, the invention contemplates an air conditioning unit which can be placed in a room to be conditioned and in which the air to be conditioned is taken in, conditioned and returned directly to the room. The units may be of standard capacity and may be distributed according to requirements. Each unit may comprise a narrow elongated chamber, such as an annular chamber, in which the impact takes place and which is provided with separate outlets through which the liquid and air is withdrawn after impact, the air returning directly to the room being air conditioned.

The operation of removing moisture from air by compressing the air may be better understood by assuming a specific example: e. g., that a given volume of air at a given temperature will, at the saturation point, contain 10 units of water in the form of vapor. If three such unit volumes of air, at such given temperature, but each containing 8 units of water (i. e., having a relative humidity of 80%) be compressed at constant temperature to one unit volume, the latter will contain 24 units of water, but, since it can retain in vapor phase only 10 units, the remaining 14 units will be precipitated out in liquid form. Upon expansion of the air to its original three volumes, the remaining 10 units of water will be distributed in the proportion of 3⅓ units of water to each unit volume of air; in other words, the relative humidity will have been reduced from 80% to 25% assuming the restoration of the air to its original temperature. If heat be extracted in greater amounts than reqired to maintain the compressed air at its initial temperature, the reduction of water content during the compression stage will be proportionally increased.

Before explaining in detail the present invention it is to be understood that the invention is not limited in its application to the details of construction and arrangement of parts illustrated in the accompanying drawings, since the invention is capable of other embodiments and of being parcticed or carreid out in various ways. Also it is to be understood that the phraseology or terminology employed herein is for the purpose of description and not of limitation, and it is not intended to limit the invention claimed herein beyond the requirements of the prior art.

In said drawings:

Fig. 3 is an elevational view of a portion of the unit; and

Fig. 4 is a view taken upon the line 4—4 of Fig. 3.

Figure 1:
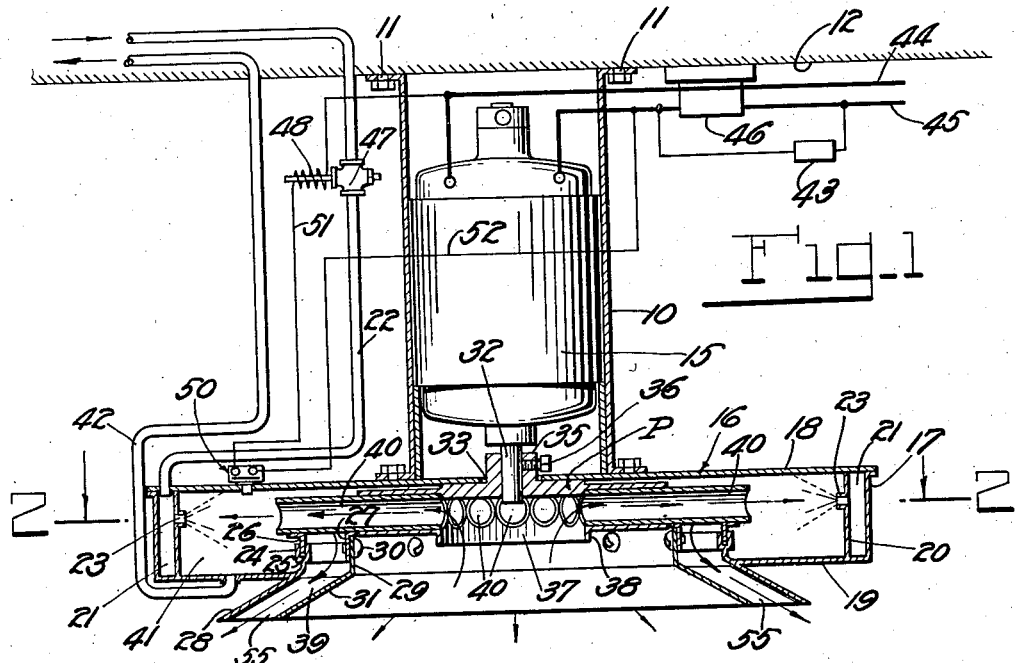
Fig. 1 is a sectional elevational view of an air conditioning unit embodying the invention.
Figure 2:
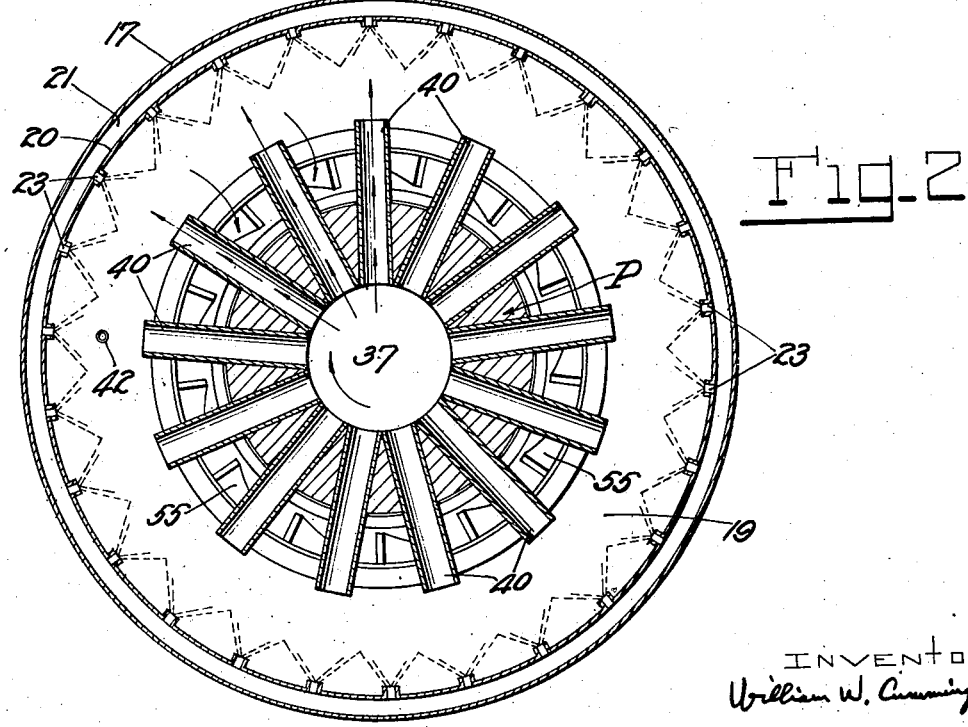
Fig. 2 is a view taken substantially on the line 2—2 of Fig. 1.

The apparatus illustrated in the drawings is a complete air conditioning unit and comprises a frame or support 10 adapted to be secured by bolts 11 to the ceiling 12 of a room to be air conditioned and serves to support a motor 15 and a substantially cylindrical casing 16. The casing 16 comprises a cylindrical wall 17 and substantially flat top and bottom walls 18 and 19 respectively. A cylindrical partition 20 is spaced from the wall 17 concentric therewith and extends between the top and bottom walls to provide an annular passage 21 for water or other liquid. The passage 21 may be supplied with liquid under pressure by a pipe 22 connected, for example, with a water main. The inner wall 20 of the passage 21 is provided with a plurality of apertures or nozzles 23 adapted to spray the liquid radially inward at high velocity. The inner edge of the bottom wall 19 is formed with an inturned cylindrical flange 24, the inner edge of which is enlarged and provided with a groove 25. A downward and outward extending conical member 28 is formed integral with the flange 24.

The armature shaft 32 of the motor 15 projects through a central opening 33 in the top wall 18 of the casing and is secured to the hub 35 of an impeller P by a set screw 36. The lower face of the hub 35 is provided with a central cavity 37 surrounded by an annular wall 38 having a plurality of radially extending tubular passages in each of which a tube 40 is secured. The tubes 40 terminate opposite but spaced from the nozzles 23 in the substantially annular chamber 41 within the casing 16. A liquid outlet pipe 42 communicates with the chamber 41 through the bottom wall 19 of the casing.

Spaced angle iron rings are secured to the tubes 40 so that their flanges 26 and 27 project downward therefrom. The flange 26 enters the groove 25 to provide a water seal therewith. A cylindrical ring 29 is secured to the flange 27 by rivets 30 and is provided with a downward and outward extending conical member 31. The member 28 and flange 24 form the outer wall of an air outlet passage 39, the inner wall of which is formed by the member 31 and ring 29. The spaces between the tubes 40 provide communication between the chamber 41 and the passage 39. A plurality of inclined blades 55 are positioned in spaced relation in the passage 39 and are secured to the member 31 for a purpose described hereinafter.

The motor 15 is supplied with electrical energy through leads 44 and 45. The lead 45 includes, in parallel, a thermostat 46 and a humidostat 43 positioned in the room to be air conditioned. Liquid is supplied to the passage 21 under the control of a valve 47 which normally is closed but adapted to be opened by a solenoid 48. The solenoid in turn is controlled by a pressure switch 50 normally open but adapted to be closed by pressure within the chamber 41. The solenoid 48 and switch 50 are electrically connected in series in a circuit completed by leads 51 and 52 across the leads 44 and 45 and in parallel with the motor.

The thermostat 46 may be adjusted to close the circuit to the motor 15 when the temperature within the room rises to a predetermined temperature, such as 80° F., and open the circuit when the temperature within the room falls to a predetermined temperature, such as 75° F. Similarly, the humidostat may be adjusted to close the circuit to the motor when the relative humidity of the air within the room rises to a predetermined amount and to open the circuit to the motor when the relative humidity has been lowered to a predetermined amount. The pipe 22 may be connected to a water main adapted to supply water to the passage 21 under pressure and at a temperature of about 68° F. Thus, the circuit to the motor 15 will be closed by the thermostat 46 when the temperature rises to a predetermined temperature or by the humidostat 43 when the relative humidity of the air rises to a predetermined amount. The circuit to the motor will be open only when both the temperature and relative humidity have been lowered to predetermined amounts.

Assuming that the temperature of the room is 77° F., the circuit to motor 15 will be open and the valve 47 will be closed. However, when the temperature of the room reaches 80° F., the thermostat 46 will close the circuit to the motor and cause the impeller to be rotated at about 3600 R. P. M. As the impeller is rotated, air will be withdrawn from the room into the impeller tubes 40 and will be forced by the action of centrifugal force into the chamber 41 at a velocity of about 300 ft. per second. This creates a pressure within the chamber 41 causing the switch 50 to close the circuit through the solenoid 48 to open the valve 47. Water then will be supplied under pressure and, for example, at a temperature of 68° F. to the passage 21 and will be sprayed through the nozzles 23 at high velocity to meet the air stream from the tubes 40 in a substantially endless impact zone. The force of the impact compresses the air and condenses excess moisture therein and contact between the air and the relatively cool water permits the water to absorb heat from the air. After impact the pressure within the chamber 41 forces the water from the chamber 41 through the outlet pipe 42 and at the same time causes the relatively dry air cooled to a temperature of about 68° F. for example, to flow through the space between the tubes 40 and thence through the passage 39 back to the room. As the air flows through the passage 39 it strikes the blades 55 and thus rotates the impeller P thus making possible the use of a smaller motor than would otherwise be required for driving the impeller.

This operation continues until the temperature of the room has been lowered to 75° F. at which time the thermostat opens the circuit to the motor and the liquid control valve. As a result, rotation of the impeller ceases and the valve 47 is closed to shut off the supply of liquid to the nozzles 23.

The air conditioning unit is designed so that the pressure created within the chamber 41 is sufficient to force used water into the outlet pipe 42 under sufficient pressure to raise it in the pipe up through the ceiling partition of the room. The pressure created within the chamber 41 is dependent upon the angle between adjacent tubes 40 which is fixed by the number of tubes employed as will be understood by those skilled in the art.

The invention provides a compact low cost air conditioning unit in which the air is withdrawn, conditioned and returned directly to the room. The units may be built with standard capacity and distributed in space according to requirements, each unit circulating air in its zone and being separately controlled. The only power required is that for driving the compressor, thus eliminating the additional power requirement of prior apparatus for moving the air from the space to be conditioned to the place of heat transfer and back as well as for circulation of refrigerant. Due to the great efficiency of heat transfer only a small volume of water is required per ton of refrigeration effect.

I claim:

1. An air conditioning apparatus comprising a chamber, means for conducting air and a relatively cool liquid in separate paths so as to meet while travelling at high velocity in opposite directions in said chamber thereby momentarily compressing the air and simultaneously removing heat therefrom, separate outlets for said air and liquid after impact to flow from said chamber, and means responsive to the temperature and relative humidity of the air outside the apparatus for controlling the flow of air and liquid into said chamber.

2. An air conditioning apparatus comprising a closed cylindrical casing having an axial air inlet, an impeller rotatably mounted within said casing to leave an annular chamber between said impeller and the cylindrical wall of said casing, said impeller being adapted to draw air through said inlet and force it at high velocity into said annular chamber, means for projecting a liquid at high velocity into said chamber in a direction to strike said air in a substantially endless impact zone, and outlets permitting said air and liquid after impact to flow from said chamber.

3. An air conditioning apparatus comprising a closed cylindrical casing having an axial air inlet, an impeller rotatably mounted within said casing to leave an annular chamber between said impeller and the cylindrical wall of said casing, said impeller being adapted to draw air through said inlet and force it at high velocity into said annular chamber and including a plurality of radially disposed tubes providing communication between said inlet and said chamber, means for projecting a liquid at high velocity into said chamber in a direction to strike said air in a substantially endless impact zone, and outlets permitting said air and liquid after impact to flow from said chamber.

4. An air conditioning apparatus comprising a closed cylindrical casing having an axial air inlet, an impeller rotatably mounted within said casing to leave an annular chamber between said impeller and the cylindrical wall of said casing, said impeller being adapted to draw air through said inlet and force it at high velocity into said annular chamber and including a plurality of radially disposed tubes providing communication between said inlet and said chamber, means for projecting a liquid at high velocity into said chamber in a direction to strike said air in a substantially endless impact zone, outlets permitting liquid after impact to flow from said chamber, and means providing an air outlet having communication with said chamber through spaces between said tubes.

5. An air conditioning apparatus comprising a chamber, means for conducting air and a relatively cool liquid in separate paths so as to meet while travelling at high velocity in opposite directions in said chamber thereby momentarily compressing the air and simultaneously removing heat therefrom, separate outlets for said air and liquid after impact to flow from said chamber, means responsive to the temperature and relative humidity of the air outside the apparatus for controlling the flow of air into said chamber, and means responsive to the air pressure within said chamber for controlling the flow of liquid into said chamber.

WILLIAM W. CUMMINGS, Jr.